N. T. Coffin.
Forming Saw Teeth.
Nº 9,848.   Patented Jul. 12, 1853.
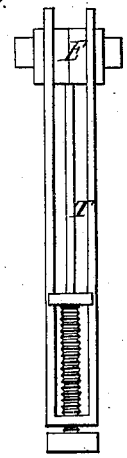
Fig: 10.
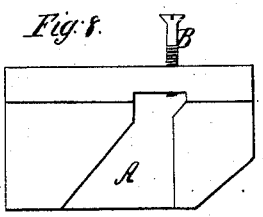
Fig: 8.
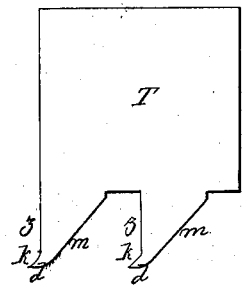
Fig: 1.
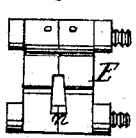
Fig: 5.
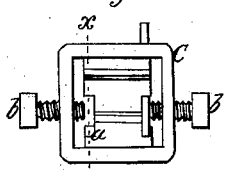
Fig: 2.
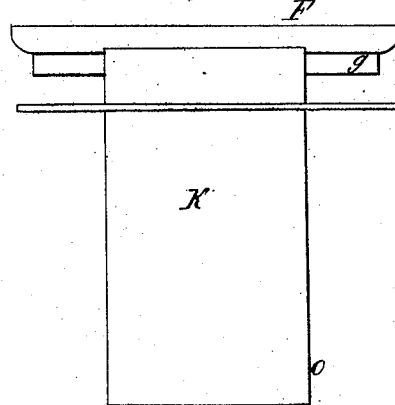
Fig: 6.
Fig: 3.
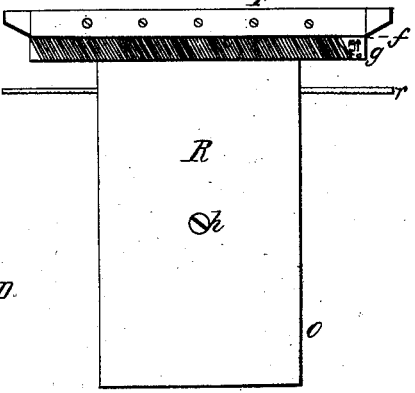
Fig: 7.
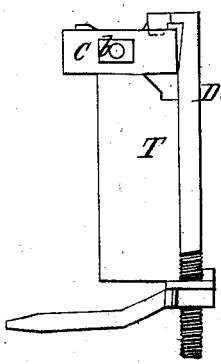
Fig: 4.
Fig: 9.

UNITED STATES PATENT OFFICE.

NATHAN T. COFFIN, OF KNIGHTSTOWN, INDIANA.

IMPROVEMENT IN FORMING TEETH ON MILL-SAWS.

Specification forming part of Letters Patent No. 9,848, dated July 12, 1853.

*To all whom it may concern:*

Be it known that I, NATHAN T. COFFIN, of Knightstown, in the county of Henry and State of Indiana, have invented a new and useful improvement in forming the chisel-teeth on mill and all other saws and keeping the same in cutting order; and I do hereby declare that the following is a full, clear, and exact description of the construction and operation of the same, reference being had to the annexed drawings, forming a part of this specification, in which—

Figure 1 is a side elevation of a tooth, showing the peculiar chisel-point. Fig. 2 is a plan of the die in which the point is formed. Fig. 3 is a section on the line $x\,x'$ of Fig. 2. Fig. 4 is a side elevation of die C and clamp, showing the tooth secured for swaging. Fig. 5 is a plan of spreading-die E. Fig. 6 is the elevation of jointing side of file-gage. Fig. 7 is the same of dressing side of file-gage. Fig. 8 is side view of gage for regulating length of point previous to swaging. Fig. 9 is a cross-section of dressing-pile. Fig. 10 is a view showing the tooth secured in the die E for swaging.

The most approved form for mill saw-teeth is that in which the point of the tooth is turned over so as to form what is termed the "chisel-tooth," which cuts the timber required to be sawed, instead of rasping it, as is the case with common straight-faced teeth. This form has heretofore been given to the tooth by the use of punches to upset or turn over the point, and by filing to bring it to the proper shape.

The object of my invention is to furnish an accurate method of forming the tooth, so that the file may be dispensed with in the formation and only used as an instrument in dressing and sharpening.

The nature of this invention consists in forming the point of the tooth entirely by swaging, which operation is accomplished by means of a die in which the ordinary straight-edged tooth is secured and the bent or chisel form given to the point by repeated blows of the hammer; also, in dressing and sharpening the saw by the use of a file-gage, in which the files are so arranged that no one tooth can be operated upon more than another, and by means of which the cutting-edges are kept in the same plane and any inequality in the set of the teeth removed.

In order that my invention may be properly understood, I will describe the process of forming the teeth, together with the tools I use to keep the saw in order, and the manner of applying them.

The teeth are first shaped like those in common use and are all fitted in the gage A by filing upon the edge $m$ of the tooth. The regulating-screw B of the gage allows the points of the teeth to be made as long as required, and at the same time causes them all to be made of the same length. After this each tooth is placed in the die C and the point swaged down to fill the cavity $a$ of the die, thus making each tooth the exact counterpart of all the others. The die is held upon the tooth and kept from slipping by the screw $b$ and clamp D. After forming the chisel-points the requisite set is given to the teeth in the usual manner; or, instead of using the die C, we may make use of the die E for turning the point, and at the same time for spreading the tooth on each side, so as not to require any additional set, this die E being so formed as to be widest at $n$, thus causing the face or cutting-edge to widen out in order to fill up the entire cavity of the die. After the teeth are fully formed, as above described, the file-gage F, constructed by setting a file at right angles to the face of the gage, is run over the edge of the saw, the file resting upon the faces $d$ of the teeth. This operation joints the teeth and assures us that the cutting-edges are all in the same plane. The opposite side of the gage is then applied to the saw for the purpose of rendering its spread uniform. The faces $d$ of the saw-teeth run along the tinned surface $f$ on the gage, and the file $g$, placed flush with the face of the gage, working lightly upon the sides of the teeth, corrects any inequality which may exist in the spread. The screw $h$ in the face of the gage regulates it to saws with either large or small sets, as during this last operation the plane face of the gage is to be kept parallel to the side of the saw.

Previous to using the file-gage F the file X, made with beveled edges to fit the side $k$ of the tooth, is passed lightly over the front of the teeth for the purpose of insuring perfect uniformity in the front faces of the chisel. The faces $y$ of the beveled file are plane, and consequently do not cut the front face $z$ of the tooth. This operation of dressing the saw has nothing to do with giving form to the teeth, which, as above stated, is done entirely by swaging, but is merely a slight application of the process of sharpening gone through with for the purpose of putting the saw in good cutting order.

When the saw becomes dull from use, the above-named instruments are applied in the manner described, first the beveled file X and then the side K of the gage F, after which the side R of the gage regulated to the set is passed lightly over the saw, and it is again ready for use. After the teeth become much worn and are too short to turn the chip properly they are again fitted to the gage A and re-formed by swaging in the die C, or in E, if it be desired to form the tooth and spread without resorting to any other means of setting.

This method of making the teeth is equally applicable to circular and other saws, and can be used with the same facility in their construction as in the mill-saw above described by varying the arrangement of the apparatus for holding the die upon the teeth, and in a few minor details, which will readily suggest themselves in the application.

As regards the advantages of the chisel-tooth it is not our province to speak, as it is well known and has been fully tested. All who have used it are also well aware of the difficulties attending its proper formation and the keeping of it in order. These disadvantages are entirely obviated by my method of forming the tooth in a die by swaging, for by that operation the several teeth will not vary a line in size and require no filing to bring them into a cutting condition. The dressing-tools run over the saw, remove any inequalities that may exist, and the teeth are then perfectly accurate, their cutting-edges in the same plane, their angles equal, and the spread of each tooth the same as all the others. This result has not been before arrived at, for in no other way have teeth been constructed combining the numerous and important advantages above enumerated.

The instruments for keeping the saw in order are constructed so that when used upon it each tooth is operated upon in the same manner, and the coincidence of the several teeth maintained without reference to the frequency with which the operation is performed.

I do not claim the form of the chisel-tooth, as teeth hooked or projecting have been made before, though not precisely of the same form as mine. Neither do I claim separately the instruments for dressing and keeping the saw in order; but What I do claim as my invention, and desire to secure by Letters Patent, is—

1. The dies E and C and gage A, constructed as described, by means of which uniform chisel-points are given to saw-teeth by swaging, substantially in the manner and for the purposes herein specified.

2. The combination of the files $r$ and $g$, the block O, tinned surface $f$, and regulating-screw $h$, forming together the file-gage F, by means of which, when used in combination with the beveled file X, the chisel-pointed saw-teeth herein described are dressed, jointed, and have their edges rendered uniform, substantially in the manner specified.

In testimony whereof I have hereunto signed my name before two subscribing witnesses.

N. T. COFFIN.

Witnesses:
  GEO. PATTEN,
  JAMES SCOTT.